J. B. BENTON.
Fare-Register.

No. 227,206. Patented May 4, 1880.

WITNESSES
Wm A. Skinkle
Geo W. Breck

INVENTOR
John B. Benton.
By his Attorneys
Baldwin, Hopkins & Peyton

J. B. BENTON.
Fare-Register.

Patented May 4, 1880.

Fig. 4.

WITNESSES
Wm A. Skinkle
Geo W. Breck

INVENTOR
John B. Benton,
By his Attorneys
Baldwin, Hopkins & Peyton

J. B. BENTON.
Fare-Register.

No. 227,206.  Patented May 4, 1880.

WITNESSES
Wm A. Skinkle.
Geo W Breck.

INVENTOR
John B. Benton,
By his Attorneys
Baldwin, Hopkins & Peyton

N. PETERS, PHOTO-LITHOGRAPHER, WASHINGTON, D.C.

UNITED STATES PATENT OFFICE.

JOHN B. BENTON, OF NEW YORK, ASSIGNOR TO THE RAILWAY REGISTER MANUFACTURING COMPANY, OF BUFFALO, N. Y.

FARE-REGISTER.

SPECIFICATION forming part of Letters Patent No. 227,206, dated May 4, 1880.

Application filed February 26, 1880.

*To all whom it may concern:*

Be it known that I, JOHN B. BENTON, of the city, county, and State of New York, have invented certain new and useful Improvements in Fare-Registers, of which the following is a specification.

Letters Patent of the United States, No. 200,642, dated February 26, 1878, were granted to Bennor and Pond for certain improvements in counting-machines having two (or duplex) registering mechanisms—to wit, a registering mechanism for counting or tallying consecutively and temporarily, or for a short time only, which is capable of being reset or turned to zero at will, and a registering mechanism to which the record or tally of the temporary register is transferred during the resetting movements of said temporary register, in order to preserve a continuous and permanent record of the counts made by the temporary register during a large number of its counting or tallying operations.

Letters Patent of the United States, No. 206,565, dated July 30, 1878, were likewise granted to Charles B. Harris for certain improvements in fare-registers having, in connection with duplex registering mechanism of the same general character as that embodied in the Bennor and Pond machine, a direction indicator or sign which indicates to the passengers or persons in the car or vehicle the direction of travel of the vehicle, whether east or west, up or down, &c.

My present invention constitutes an improvement more especially upon the machines patented as above mentioned, and my register embodies in its organization duplex registering mechanism of the character invented by Bennor and Pond—to wit, a temporary and a transfer register, as also a direction-indicator and an alarm apparatus, the said alarm apparatus being sounded during the process of counting or tallying upon the temporary or adjustable register once for each actuation of said register, whereby the passengers and others in the car are notified of the proper registry of the fares collected, the collector or conductor being required, as each fare is collected, to operate the machine.
My invention consists of certain new combinations of devices, which are set out at the close of this specification, the object of my said invention more particularly being to provide a fare-register which will be proof against fraudulent manipulations by the conductor, and which will compel him to render to the company or proprietor a true and faithful account of the collections made or fares received, the register being a perfect monitor over the conductor's honesty, while comparatively simple in its construction.

In the accompanying drawings, which represent my said new combinations of devices as embodied in the best way now known to me.

The machine shown in the present example particularly resembles, in its general construction and organization, the machine shown in the Bennor and Pond patent, before mentioned, and I will not therefore elaborately describe the various parts not necessary to a full understanding of my invention.

It will be understood that for a full description of the parts not herein particularly explained I refer to the said Bennor and Pond patent, or, preferably, to the reissue thereof, the application for which is now pending.

The inclosing-casing is composed of a back or base plate, A, and a cap or cover, A', which constitutes as well the front of the casing as the sides thereof, the said cover being secured to the base-plate by suitable fastening devices which prevent their separation.

The register, as organized in this example, is intended to be secured in place at one end of the car or vehicle, and to be operated by a suitable connection extending through the car.

The registering mechanism is composed of two sets, one of which is known as a "temporary" or "trip" register, and is the one actuated in the process of counting consecutively by the actuator or prime mover of the machine once for each fare received, and is capable of being returned or reset to zero at will, while the other of said sets of registering mechanism is known as a "transfer" or "permanent" register, which remains unacted upon during the counting operations of the temporary register, but is so organized as to receive or have transferred to it during the resetting movements of the temporary register the exact count or tally made by said temporary register.

The temporary or trip register consists, in the present example, of three wheels, B B' B², which are, respectively, the units, tens, and hundreds wheels of said register, the first of said wheels registering units, the next tens, and the next hundreds, the said wheels being provided with the figures 0 to 9, inclusive, on their upper faces, as usual.

It will be unnecessary to describe the said tens and hundreds wheels B' B² further than to say that they are mounted on suitable sleeves turning around fixed or stud axles rising from the base-plate of the machine, and are preferably constructed so as to work on the principle of the well-known "Geneva stop-wheel."

The units-wheel B of the trip-register is mounted upon the upper or front end of a sleeve, b, capable of turning freely upon a fixed pin or stud-axle, C, rising from the base-plate. Forming part of the said sleeve, or firmly connected therewith, is a ratchet-wheel, b', having ten teeth in its periphery, and above said ratchet-wheel is a spur-wheel, b², while a one-toothed plate, b³, lies above said spur-wheel. Below the said ratchet-wheel b', and capable of turning freely around a reduced portion of the sleeve b, is a ratchet-wheel, c, similar to the ratchet-wheel b'. The said ratchet-wheels b' and c constitute the actuating ratchet-wheels of the trip-register and of the alarm apparatus, respectively, both being actuated simultaneously by a common prime mover. The said alarm apparatus consists of a pivoted bell-hammer, D, and a bell, E, the arm of said hammer being provided with a tooth or projection, d, which engages the teeth of the ratchet-wheel c, and is tripped thereby to sound the alarm as the said wheel is revolved, the tooth of the hammer-arm rising upon a receding tooth and dropping quickly into the following notch, owing to the action of a spring, C', which exerts its force upon the short arm d' of the hammer-lever in a well-known way.

The prime mover or actuator consists, in this example, of a pivoted lever, F, one end of which extends outside the casing to form a handle. Said lever is provided with a pivoted actuating-pawl, f, the point of which is broad enough to engage the teeth of the ratchet-wheels b' c, to actuate them when the lever is vibrated, the lever at the end of its actuating-stroke being returned automatically to a position in readiness for a new actuation by a suitable spring, F', as usual.

In order to prevent the ratchet-wheels b' and c from being propelled farther than they should go at each actuation of the lever F, I make use of the positive stop f' of the actuating-lever of the Bennor and Pond machine; and, further, in order to prevent the possibility of sounding the alarm without actuating the register, I also make use of the Bennor and Pond fine-toothed wheel c', which is connected with the ratchet-wheel c, and prevents the recoil of the hammer to strike the bell in case a full movement of the actuating-lever is not made, the said wheel c being, by the secondary wheel c' and a suitable pawl, c², engaging therewith, prevented from back movement.

The indications of the temporary or trip register are read or inspected through suitable openings in a face-plate, G, one number only of each wheel being visible through its respective opening, while the cover or cap-plate of the inclosing-casing is provided, over the face-plate G, with a suitable glass-covered window.

The transfer or permanent register consists of a train of four registering-wheels, H H' H² H³, mounted on their respective carrying-sleeves, which turn around fixed pins or stud-axles rising from the base-plate. The said wheels are provided on their upper faces with the numerals 0 to 9, inclusive, as usual, and respectively register units, tens, hundreds, and thousands.

The organization of the general register is such that its wheels turn, in their counting operation, in a direction opposite to that in which the trip or temporary register wheels turn when actuated by the prime mover. It is unnecessary to particularly describe the tens, hundreds, and thousands wheels H' H² H³ of this train, as they are of well-known construction and operate on the "Geneva-stop" principle.

The sleeve I, on the upper end of which the units-wheel H of the permanent register is mounted, is provided at its lower end with a ratchet-wheel, $i$, fixed to the sleeve, with which a pawl, $h$, engages, to prevent back movement of the permanent-register train. Upon the said sleeve, above said ratchet-wheel $i$, is fixed a one-toothed wheel, $i'$, which actuates the tens-wheel once at every complete revolution of the units-wheel H and its carrying-sleeve, while intermediate of said one-toothed wheel $i'$ and a ratchet-wheel, $i^2$, fixed to the aforesaid sleeve near its upper end, is a spur-wheel, J, of the same diameter and having the same number of teeth as the spur-wheel $b^2$ of the trip-register. Said spur-wheel J is free to turn around the sleeve I, and is provided with a pivoted pawl, $j$, adapted to engage the teeth of the ratchet-wheel $i^2$, whereby when turned in the direction to engage its pawl $j$ with the ratchet-wheel $i^2$ the spur-wheel J will compel the rotation of the unit-wheel H of the permanent register in its counting direction, but when turned in the opposite direction said wheel is free to revolve around the sleeve I without moving it, the pawl $j$ riding or dragging over the teeth of the said ratchet-wheel $i^2$.

A spur-wheel, K, meshing with both the spur-wheel $b^2$ of the trip-register and with the spur-wheel J of the permanent register, is loosely mounted upon a sleeve, L, turning around a stud-axle, M, rising from the base-plate of the machine.

Said spur-wheel K carries a pawl, $k$, adapted to engage one of the teeth of a ratchet-wheel, $l$, fixed upon the sleeve L, just above the spur-wheel K, whereby if said sleeve L be turned in one direction the spur-wheel K will be likewise turned, owing to the engagement of a tooth of the ratchet-wheel $l$ with the pawl $k$ of the spur-wheel K, while if turned in the opposite direction said spur-wheel K will not be turned, as the pawl $k$ will ride over the teeth of the ratchet-wheel $l$ as it is revolved.

In order to turn said spur-wheel K, which constitutes the resetting mechanism of the trip-register, and transfer the count or tally of said register to the permanent registering-train, I square the upper end of the sleeve L, or otherwise fit it to receive a suitable key or device, which can readily be applied to turn the sleeve, and with it the spur-wheel K.

The construction of the mechanism thus far described is substantially the same as that of the Bennor and Pond machine, and the operation is as follows:

The lever F is vibrated to engage the actuating-pawl $f$ with the ratchet-wheels $b'$ $c$ of the temporary register and alarm apparatus, which register is moved one point or one indication, and the alarm is sounded for each vibration of said lever. During the counting operation the spur-wheels J K turn loosely about their sleeves without affecting the count preserved by the permanent register.

When it is desirable to reset the temporary register—as, for instance, at the end of each trip of the car—the key is applied to the squared end of the sleeve or shaft L, and turned in the direction to engage the ratchet-wheel $l$ with the pawl $k$ of the spur-wheel K, and consequently turning the said spur-wheel, and with it the spur-wheel J of the permanent register, in a direction to increase the indication of said register, while at the same time the spur-wheel $b^2$ of the temporary register is turned in the direction to loose or displace its record and bring its wheels to the zero or starting point. A transfer, therefore, is made of the exact count or tally made by the trip-register to the permanent register.

I will now describe my present improvements upon the Bennor and Pond machine above described.

In using the said Bennor and Pond machine I have found that if the resetting-key be turned in the wrong direction—that is, in a direction opposite to that necessary to reset the trip-register—there is liability of a count being made upon the said trip-register. The organization of said machine is such that if the spur-wheel K, connected with the key sleeve or shaft L, for turning the trip-register back and for making the transfer, works properly, then there is no danger of counting by said wheel, as it will be unaffected when the shaft L is turned in the wrong direction, owing to the disengagement of the ratchet-wheel of said shaft and the pawl of said spur-wheel, while if said spur-wheel be turned in the right direction by its key the trip-register will be turned back or reset and its count transferred to the permanent or receiving register. Should, however, dust or grit accumulate between the ratchet-wheel $l$ of the key-shaft L and the spur-wheel K, or should the pawl $k$ of said wheel, by rust or otherwise, refuse to operate, then the turning of the key in the wrong direction will turn the spur-wheel with the shaft, and a count or series of counts will be made upon the trip-register, which can only be removed by transferring them to the general register, which register would thus show a record of a greater number of fares than was actually received. This trouble increases with the wear of the machine, and in order to obviate the objection and positively prevent actuation of the trip-register by turning the resetting-key in the wrong direction, I connect with the spur-wheel J of the permanent register a detent-wheel, O, having ten teeth or notches in its periphery, and pivot on the upper surface of the actuating-pawl $f$ of the lever F a dog, $o$, which, when the said actuating-lever is in its normal position, engages a tooth of the said detent-wheel, and thereby positively prevents the spur-wheel J and the wheels K and $b^2$, meshing therewith, from turning in the wrong direction should the resetting-key be turned in the direction opposite to that which is to reset the trip-register and make the transfer.

The dog $o$, it will be observed, is limited in its movement by a stop-pin, $o'$, rising from the pawl $f$, so as to form a locking-stop to the detent-wheel O, and prevent it from turning except in the counting direction when the lever is in its normal position, while at each actuation of the lever F the dog o is carried out of engagement with the detent-wheel O, thereby allowing the wheels J and K to turn freely with the spur-wheel $b^2$ of the trip-register as the unit-wheel of said register is actuated.

It will be observed that one numeral on each of the registering-wheels of the permanent register is read or inspected through its respective opening in the face-plate G of the casing and window of the cover of the inclosing-casing.

In order to obscure and hide the indications of the permanent register from the conductor or collector, as well as from the public, and to prevent confusion in reading the trip-register, while enabling the indications to be readily inspected by the proper officer or person, I interpose between the face-plate G and the permanent-register wheels a slide-plate, P, fitted to move endwise in guides formed on the under side of said face-plate G, the said slide-plate having openings corresponding with those in the face-plate, which, when in coincidence with the openings of said face-plate, permit free inspection of the count or tally made by the permanent register, but which, when moved out of coincidence, effectually conceal the register-wheels from view.

This slide-bar is governed in its movements by a "Yale" lock, N, from a turning cylinder or portion, n, of which projects a lever or arm, p, connected with the slide-plate and normally locked in position to maintain said plate with its openings out of coincidence with those in the face-plate. The connection between the lever p and the obscuring-slide is a yielding one, so as to permit compensation for the differences in movement of the straight reciprocating slide and the turning-lever, the connection being made, preferably, by the bent end of the said lever fitting a transverse slot in the end of said slide. The obscuring slide-plate is controlled by a key, which is inserted in the lock and turned, which operation shifts the plate through the lever p.

I am aware that a sliding obscuring-plate for the purpose described is old, broadly considered, being shown in Deschamp's patent of 1854.

A direction-indicator, consisting of a sliding plate, Q, fitted to move in guides g g upon the upper surface or front of the face-plate G, is governed in its movements by a disk, R, mounted just beneath the cover A' of the register-casing upon one end of a shaft, r, fitted so as to turn freely in a bearing, r', in said cover. The upper end of this shaft r extends outside the casing, and is provided with a suitable knob or thumb-wheel, S, to move it in shifting the direction-plate Q, which is connected with the disk R by a crank-pin, $r^2$, extending from the disk. The shifting-knob is limited to a half-turn by shoulders $r^3$ $r^3$, formed on the disk R, one or the other of which is held against a stop-pin, t, by a spring-connection, T, connected at one end with the disk and at the other to, for instance, a stud or pin, a, projecting from the inner surface of the cover A'.

The face of the direction-plate is provided with letters, signs, or marks indicating the direction of travel of the car, the letters indicating, in this instance, the direction of travel as "up" or "down," the word "up" appearing opposite suitable openings or windows in the cover of the casing when the shifting-knob S is in one position, while the said word "up" will be hidden or displaced and the word "down" brought into view through the windows when the direction-plate is shifted by turning the shifting-knob to its other position, in one or the other of which positions the knob is maintained by the spring-connection T, before described.

Figure 1:
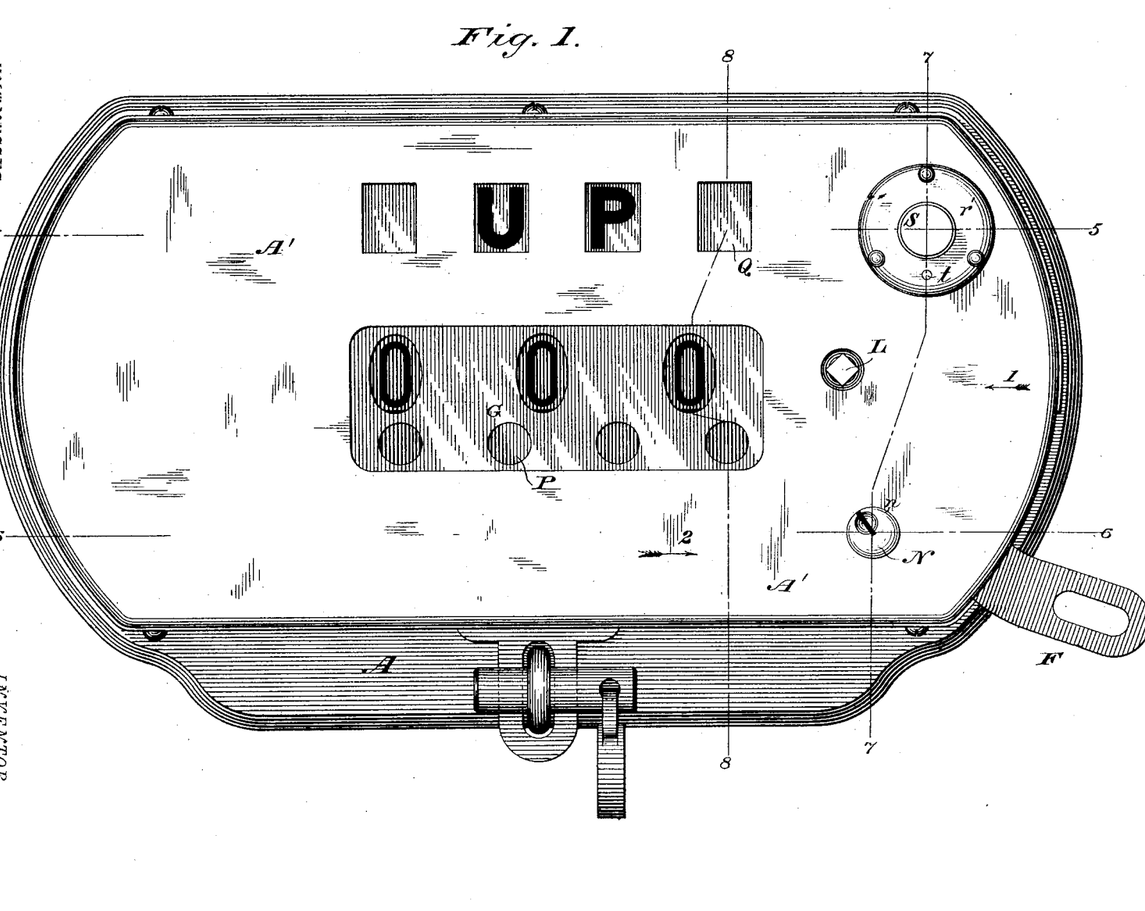
Figure 1 represents a front view or elevation of my improved apparatus, the direction of travel being indicated as "up," while the temporary or trip register is at zero or the starting-point.
Figure 2:
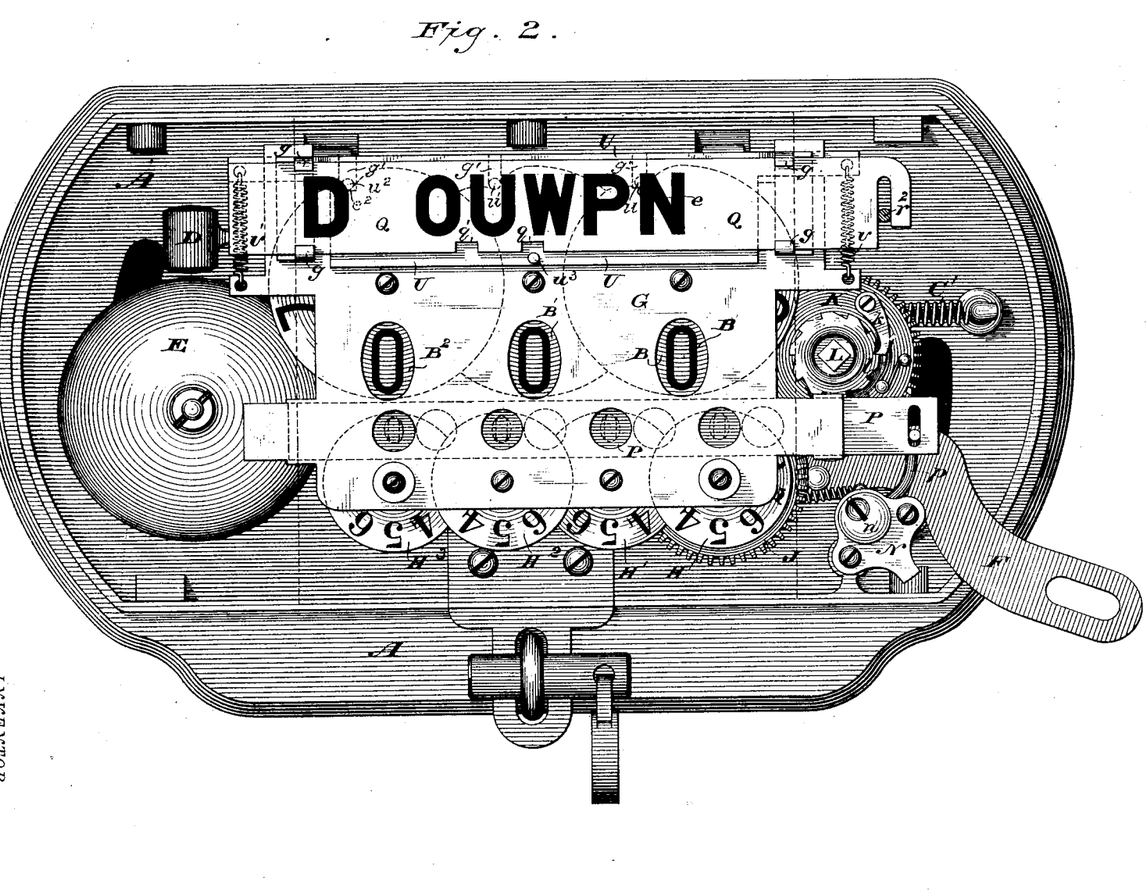
Fig. 2 is a similar view to that shown in Fig. 1, with the top plate or cover of the inclosing-casing removed to exhibit the internal parts of the machine.
Figure 3:
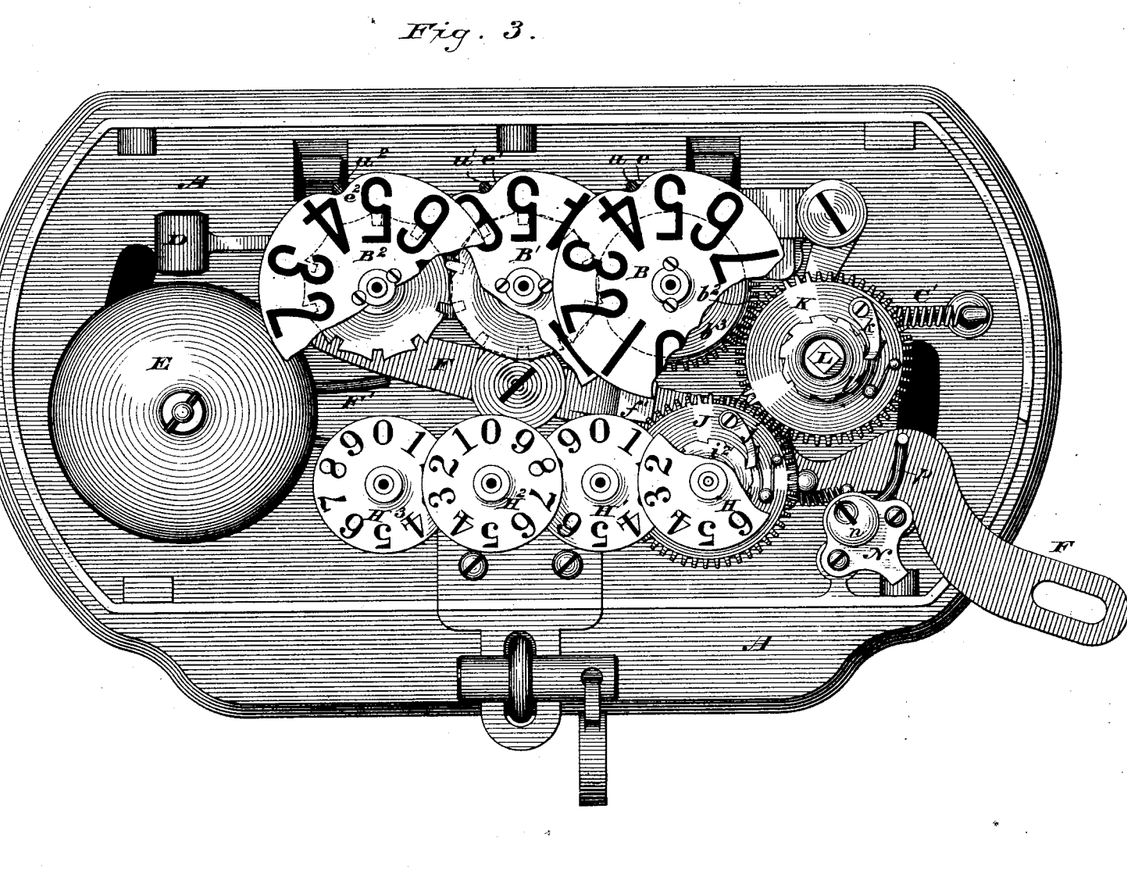
Fig. 3 is a view similar to that shown in Fig. 2, with some of the upper works of the apparatus removed and parts of the register-disks broken away to more clearly show the parts beneath.
Figure 4:
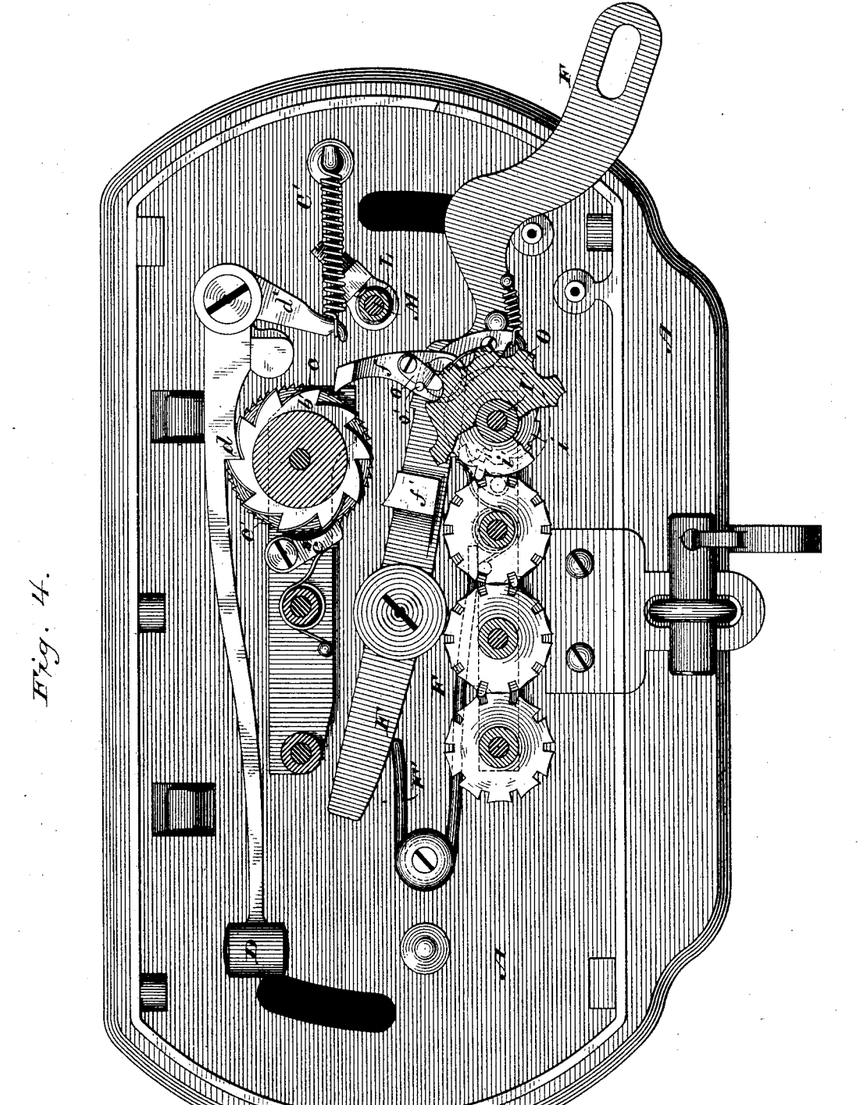
Fig. 4 is a view similar to that depicted in Fig. 3, with the register-disks removed and some of their actuating parts in section.
Figure 5:
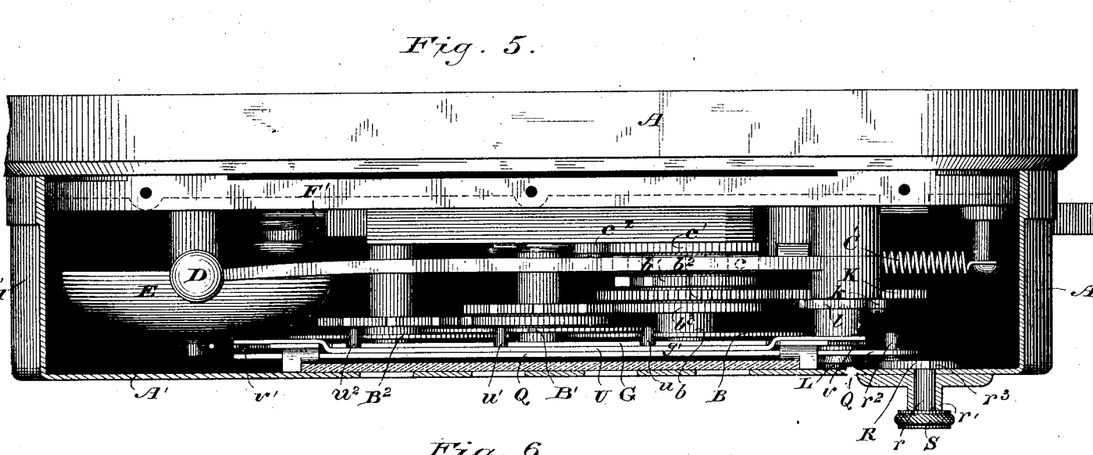
Fig. 5 is a longitudinal section through the casing of the machine on the line 5 5 of Fig. 1, showing an edge view of the apparatus when looking from the temporary-register side of the machine as inverted.
Figure 6:
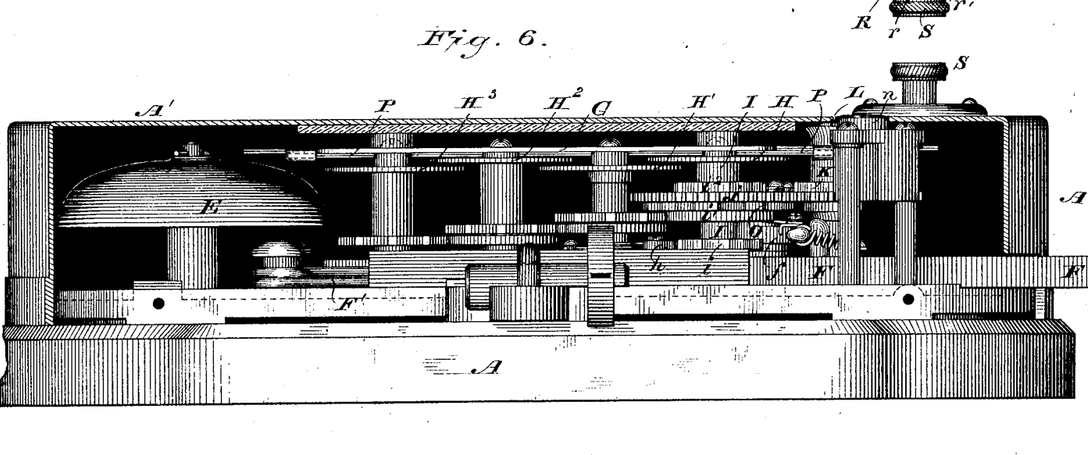
Fig. 6 is a similar section on the line 6 6 of said Fig. 1, showing an edge view of the apparatus, looking from the transfer or permanent register side of the machine.
Figure 7:
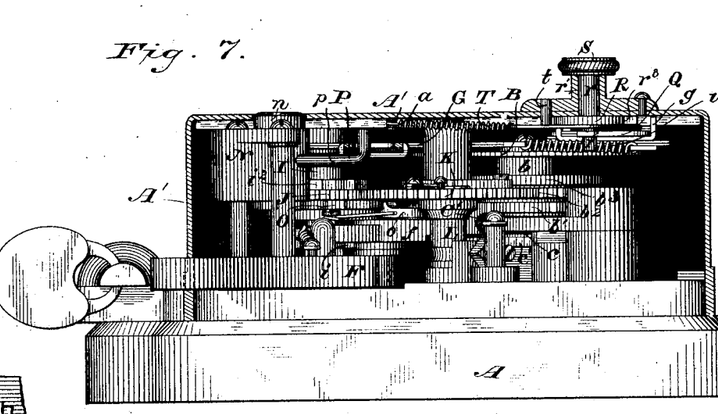
Fig. 7 is a transverse section through the apparatus on the line 7 7 of Fig. 1, looking in the direction indicated by the arrow 1 in said figure.
Figure 8:
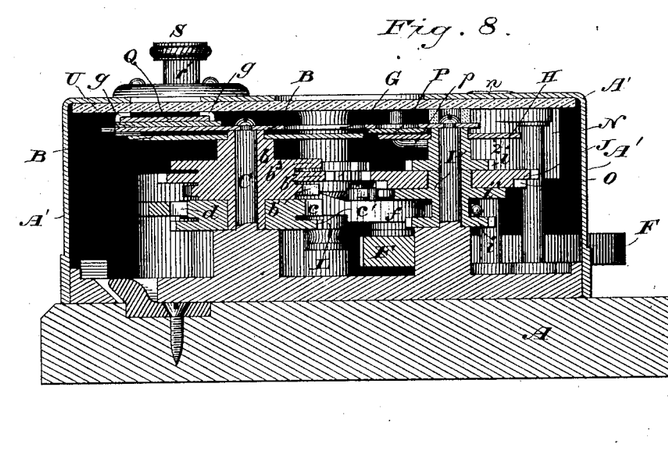
Fig. 8 is a similar view on the line 8 8 of said Fig. 1, looking in the direction indicated by the arrow 2 in said figure.
Figure 9:
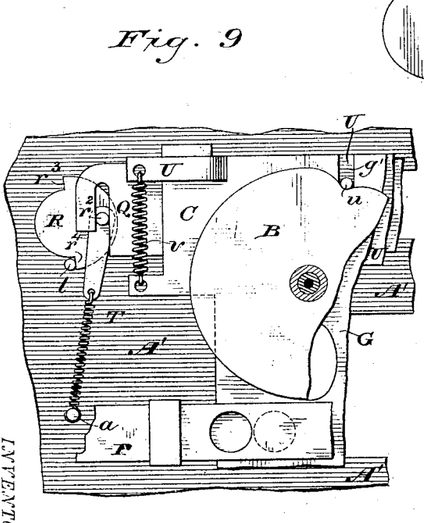
Fig. 9 is a view of an inverted portion of the mechanism lying immediately beneath the face-plate or cover of the machine.

In order to prevent the direction-indicator from being shifted or its indication displaced until the trip-register has been set to zero or the starting-point, I interpose between said direction-plate Q and the face-plate G a locking-plate, U, which is movable in a direction across the path of reciprocation of the sliding direction-plate, and is provided with, in this instance, three pins, $u$ $u'$ $u^2$, which project inwardly through slots $g'$, formed in the upper edge of the face-plate G. These pins lie in recesses $e$ $e'$ $e^2$, respectively formed in the periphery of the register-wheels B B' $B^2$ of the trip-register when said wheels are at the zero indication or starting point, and are held therein by the action of suitable springs, $v$ $v'$, one at each end of the locking-plate U, one end of said springs being connected with the stationary face-plate G and the other with the locking-plate, and the tendency of said springs is to draw the locking-plate down with its pins in the recesses of the register-wheels, so as to carry a stop-pin, $w^3$, projecting from the upper surface of the locking-plate near its lower edge, out of a recess or slot, $q$, in the bottom edge of the direction-plate, as clearly shown in Fig. 2, which thus permits the said direction-plate to be moved endwise by its shifting-knob to change its indication.

When, however, an actuation of the trip-register takes place, the pin of the locking-plate lying in the recess of the wheel moved will be cammed outward, carrying the locking-plate in an upward direction with it, whereby the locking-pin $w^3$ also will be moved upward, and will enter one or the other of the two slots $q$ $q'$ in the direction-plate, according to the indication exhibited by said plate, thereby locking the said plate from endwise movement until the register is again brought to zero by the resetting mechanism.

Having thus described my invention, what I claim is—

1. The combination, substantially as hereinbefore set forth, of the temporary or trip register, the permanent or receiving register, the resetting mechanism of the trip-register, and the dog or device carried by the actuator or lever of the trip-register, which positively prevents movement of the temporary register in its counting direction by said resetting mechanism.

2. The combination, substantially as hereinbefore set forth, of the permanent register, the face-plate, through windows or openings in which the count or record of said register may be inspected, the obscuring-slide interposed between said register and said face-plate and provided with openings corresponding to the windows in the face-plate, the lock for securing the slide normally in position to hide or prevent inspection of the permanent register, provided with a turning portion or cylinder, the lever projecting from said cylinder, and the yielding connection between said lever and the obscuring-slide to compensate the differences in their movement.

3. The combination, substantially as hereinbefore set forth, of the registering mechanism, the endwise-movable direction-indicator, to indicate the direction of travel of the car or vehicle, the guides for said indicator, the devices for preventing said indicator from being shifted until the registering mechanism is at zero, and the devices by which the indicator is moved.

4. The combination, substantially as hereinbefore set forth, of the trip-register, the wheels of which are provided with recesses, the sliding direction-plate, having locking shoulders or recesses in its edge, and the sliding locking-plate interposed between the register-wheels and the direction-plate, having pins or projections at one side engaging the recesses in said register-wheels when at zero, and a locking pin or projection on the other side, adapted to engage the locking-recess in the direction-plate automatically when one of said register-wheels is actuated in the process of counting.

5. The combination, substantially as hereinbefore set forth, of the casing, the sliding plate direction-indicator, the turning-disk connected with the said indicator-slide, the spring-connection acting upon the disk to maintain it in its adjusted position, and the knob outside the casing for turning said disk to shift the indicator.

In testimony whereof I have hereunto subscribed my name.

JOHN B. BENTON.

Witnesses:
WM. S. BEAMAN,
ANTHONY GREF, Jr.